(12) United States Patent
Alexander et al.

(10) Patent No.: US 9,075,600 B2
(45) Date of Patent: Jul. 7, 2015

(54) PROGRAM STATUS WORD DEPENDENCY HANDLING IN AN OUT OF ORDER MICROPROCESSOR DESIGN

(75) Inventors: Gregory W. Alexander, Pflugerville, TX (US); Brian D. Barrick, Pflugerville, TX (US); Michael Billeci, Poughkeepsie, NY (US); Fadi Y. Busaba, Poughkeepsie, NY (US); Bruce C. Giamei, Poughkeepsie, NY (US); David A. Schroter, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 12/822,974

(22) Filed: Jun. 24, 2010

(65) Prior Publication Data

US 2011/0320782 A1   Dec. 29, 2011

(51) Int. Cl.
  *G06F 9/30*   (2006.01)
  *G06F 9/38*   (2006.01)
(52) U.S. Cl.
  CPC .......... *G06F 9/30101* (2013.01); *G06F 9/3838* (2013.01); *G06F 9/384* (2013.01)

(58) Field of Classification Search
  None
  See application file for complete search history.

(56) References Cited

U.S. PATENT DOCUMENTS

| 6,088,791 A | * | 7/2000 | Slegel et al. | 712/223 |
| 2002/0078327 A1 | * | 6/2002 | Jourdan et al. | 712/219 |

FOREIGN PATENT DOCUMENTS

EP   550287 A2 * 7/1993   ........... G06F 9/38

OTHER PUBLICATIONS

Intel Itanium Architecture Software Developers Manual, vol. 2: System Architecture, Revision 2.2. Jan. 2006; pp. 1-654; relevant pp. 35-60.

* cited by examiner

*Primary Examiner* — William B Partridge
(74) *Attorney, Agent, or Firm* — Cantor Colburn LLP; Margaret McNamara

(57) ABSTRACT

A computer implemented method of processing instructions of a computer program. The method comprises providing at least two copies of program status data; identifying a first update instruction of the instructions that writes to at least one field of the program status data; and associating the first update instruction with a first copy of the at least two copies of program status data.

18 Claims, 5 Drawing Sheets

PROGRAM STATUS WORD DEPENDENCY HANDLING IN AN OUT OF ORDER MICROPROCESSOR DESIGN

BACKGROUND

This invention relates generally to processing within a computing environment, and more particularly to program status word dependency handling in a computing environment.

Program status words (PSW) are an area of memory or a hardware register that contains information about a program state used by the operating system and the underlying hardware. The PSW typically includes thirty two or sixty four bits that are divided into one or more fields. At least one field of the PSW typically includes a pointer (address) to the next instruction to be executed.

The fields of the PSW can be referenced either explicitly (e.g., when instruction execution reads part of the PSW bits as in instructions IAC, IPK, STOSM), or implicitly (e.g., in instructions fetching, operand fetching, address generation calculations, address generation sources, etc.). The explicit reference can be performed at execution time, whereas the implicit reference can be performed at different stages of the pipeline (i.e., instruction fetch, instruction decode, execution time and completion time). Individual fields in the PSW can be referenced or updated independently and thus, require special handling.

BRIEF SUMMARY

An embodiment includes an apparatus for processing instructions of a computer program. The apparatus includes a processor configured to perform a method. The method comprises providing at least two copies of program status data; identifying a first update instruction of the instructions that writes to at least one field of the program status data; and associating the first update instruction with a first copy of the at least two copies of program status data.

Another exemplary embodiment includes a computer implemented method of processing instructions of a computer program. The method comprises providing at least two copies of program status data; identifying a first update instruction of the instructions that writes to at least one field of the program status data; and associating the first update instruction with a first copy of the at least two copies of program status data.

Yet another exemplary embodiment includes a computer program product for processing instructions of a computer program. The computer program product includes a tangible storage medium readable by a processing circuit and storing instructions for execution by the processing circuit for performing a method. The method comprises providing at least two copies of program status data; identifying a first update instruction of the instructions that writes to at least one field of the program status data; and associating the first update instruction with a first copy of the at least two copies of program status data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides systems and methods for handling program status words (PSW) in a processing environment. Generally speaking, the methods and system evaluate the timing of the execution of instructions relative to updates to the PSW to handle the use of the PSW. For example, instructions older than a PSW update instruction are made to reference/consume previous PSW bits, whereas instructions younger than the PSW update instruction are made to consume an updated PSW.

Figure 1:
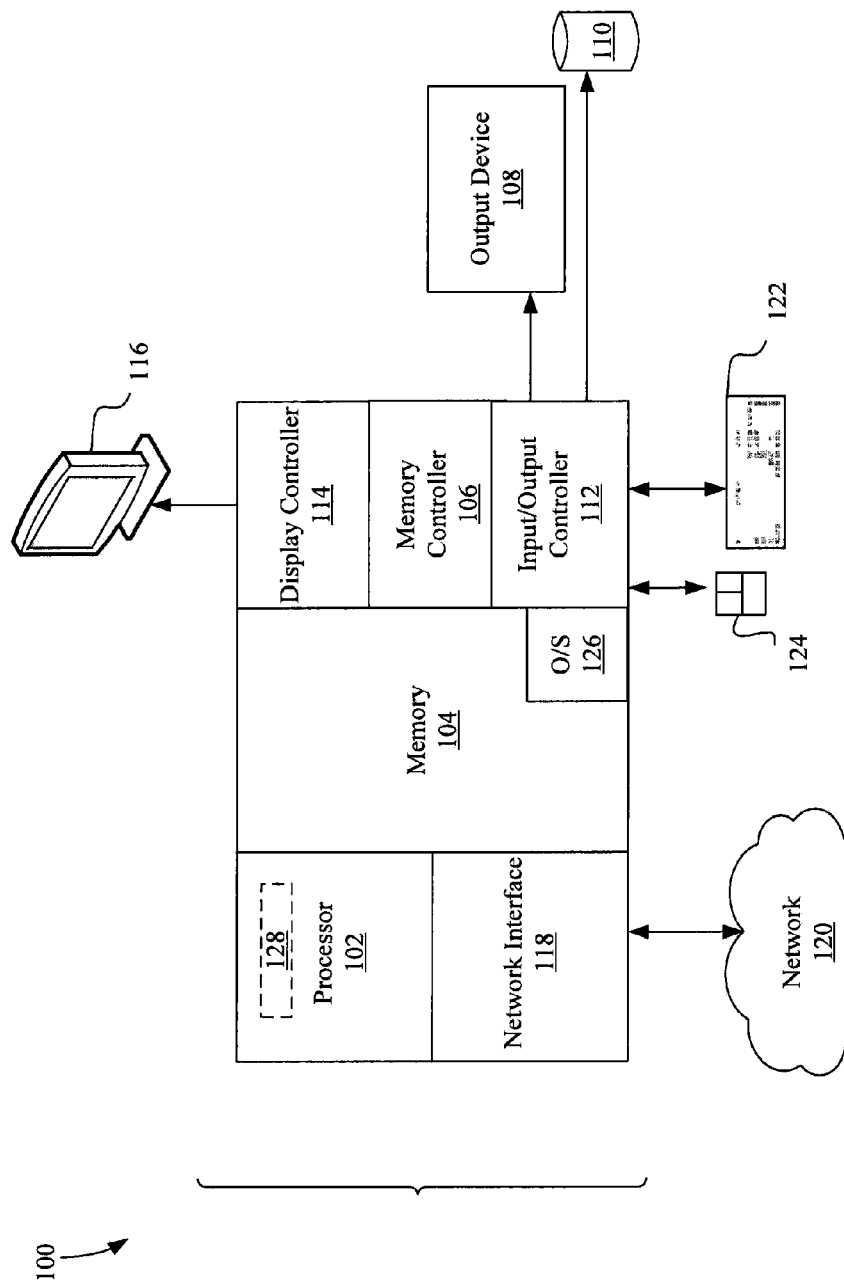
FIG. 1 is a block diagram illustrating a computing system that includes a program data handling system in accordance with exemplary embodiments.

Turning now to FIG. 1, a block diagram illustrates an exemplary computing system 100 that includes PSW handling methods and systems in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, the system 100 can further include a network interface 118 for coupling to a network 120. The network 120 transmits and receives data between the computer 101 and external systems. In an exemplary embodiment, a conventional keyboard 122 and mouse 124 can be coupled to the input/output controller 112.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 102 includes the program data handling systems and methods 128 as described herein.

Figure 2:
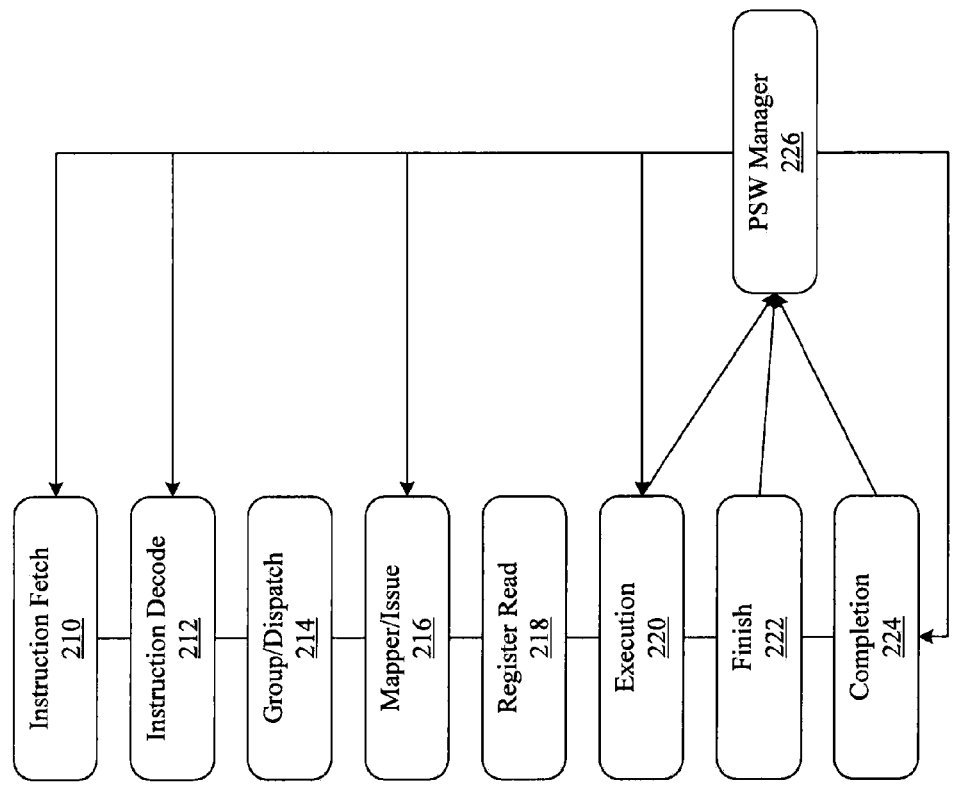
FIG. 2 is a functional block diagram illustrating a pipeline of the processor of the computing system in accordance with exemplary embodiments.

Turning now to FIG. 2, the processor 102 of FIG. 1 is illustrated in accordance with exemplary embodiments. The processor 102 includes a pipeline 200 of one or more pipeline stages. In various embodiments, the processor 102 may support multiple pipeline paths for instruction execution, e.g., a superscaler architecture. For ease of the discussion, the disclosure will be discussed in the context of single pipeline path as illustrated in FIG. 2.

As shown in FIG. 2, exemplary pipeline stages can include, but are not limited to, an instruction fetch stage 210, a decode stage 212, a group and dispatch stage 214, a mapper and issue stage 216, a register read stage 218, an execution stage 220, a finish stage 222, and a completion stage 224. As can be appreciated, the operations of the pipeline stages can be combined and/or further partitioned into other pipeline stages, not shown. As can further be appreciated, additional stages can be added or removed without altering the spirit of the methods and systems of the present disclosure.

Generally speaking, the instruction fetch stage 210 acquires instructions to be processed from an instruction cache and passes the instructions to the instruction decode stage 212. The instruction decode stage 212 performs full instruction decodes, generating instruction processing information which is passed to the group and dispatch stage 214. The group and dispatch stage 214 groups a set of decoded instructions and identifies their operand sources and targets. The dispatch stage 214 also identifies the operand size, and operand type based on information in the PSW. For example, in a load instruction, the base register, index register and target register are identified and reported to the mapper and issue stage 216.

The mapper part of the mapper and issue stage 216 maps the logical registers identified at dispatch time to physical register numbers. The mapper part can also handle resolving dependencies. The issue part of the mapper and issue stage 216 then writes the instructions to an issue queue with the instruction dependency information. Once instructions are issued, register operands and other relevant data needed for execution (e.g. condition code, PSW bits) are read in from the mapped registers in the register read stage 218. The execution stage 220 executes the instructions. The finish stage 222 indicates that the instruction has finished and is passed a reject point. The completion stage 224 performs all checks and the instruction is passed a flush point.

Figure 3:
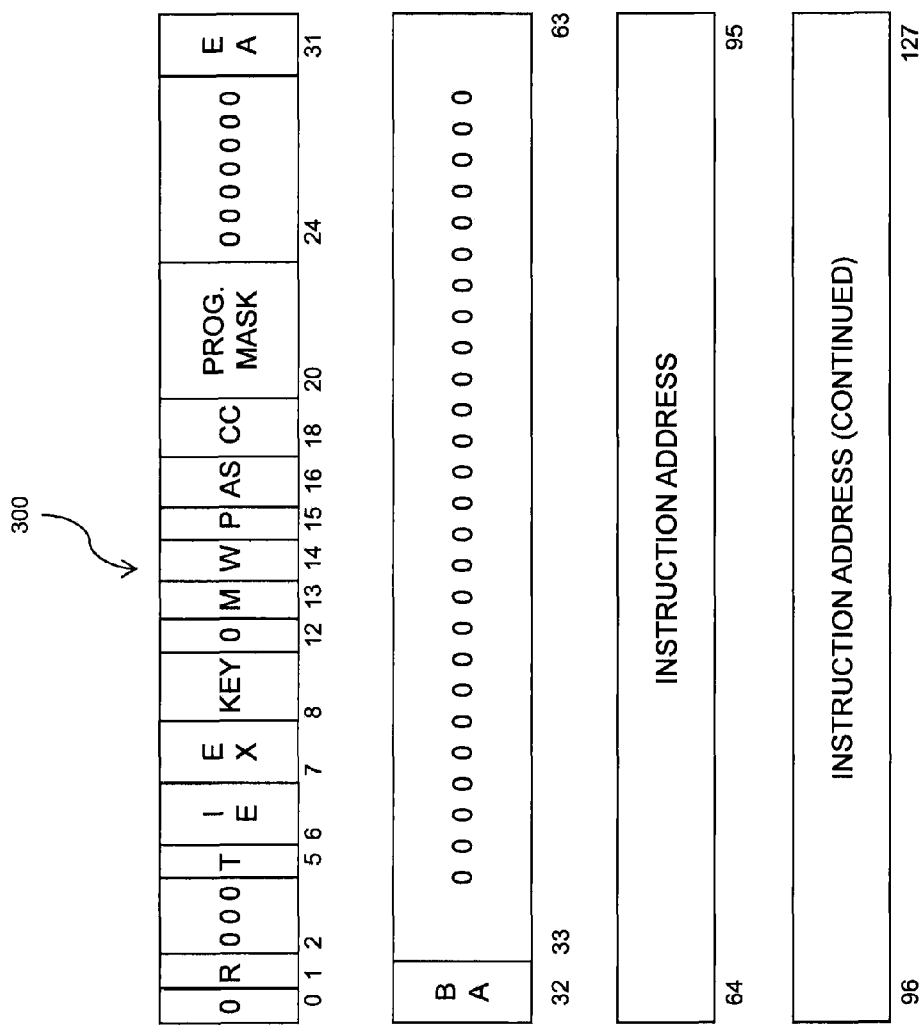
FIG. 3 is an exemplary program status word of the processor in accordance with exemplary embodiments.

A PSW manager 226 is provided that manages a PSW of the instructions in the pipeline 200. As shown in FIG. 3, the PSW 300 can include multiple fields (e.g., PER bit, DAT bit, IO bit, E bit, KEY, AS, condition code, program mask, addressing code, etc.). Each of the fields can be implicitly accessed (e.g., written to or read from) or explicitly accessed (e.g., written to or read from) based on the instructions being processed in the pipeline 200. The PSW manager 226 manages the PSW 300 associated with the instructions in the pipeline 200 to accommodate the random timing of accessing the fields.

In various embodiments, the PSW manager 226 allocates at least two registers and stores at least two copies of the PSW (e.g., psw_copy1, and psw_copy2) in the two registers, one copy in each register. As can be appreciated, any number of registers can be used to manage any number of copies of the PSW. For exemplary purposes, the disclosure will be discussed in the context of the two copies stored in the two registers. The PSW manager 226 further maintains a pointer that points to one of the registers that stores one of the copies. The pointer is used to associate an instruction with the copy of the PSW.

Figure 4:
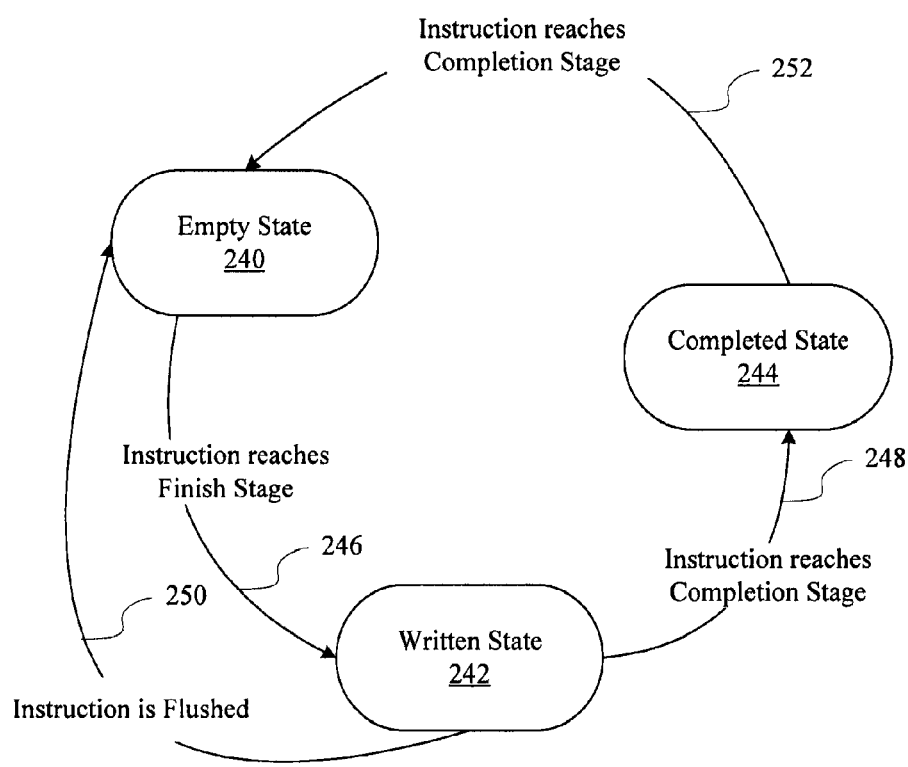
FIG. 4 is state transition diagram illustrating states of a program status word copy.

In various embodiments, the copies in the registers are managed in a round-robin fashion based on the instructions passing through the pipeline 200. For example, as shown in FIG. 4, the PSW manager 226 assigns a state to each copy based on transition conditions. The states can be, but are not limited to, an empty state 240, a written state 242, and a completed state 244.

The transition conditions are based on a current stage of a PSW update instruction (e.g., an instruction that writes to the PSW) in the pipeline 200. For example, at dispatch time, PSW update instructions (or Uops) are identified, and upon dispatching a PSW update instruction, the PSW update instruction is associated with a particular PSW copy by toggling the PSW pointer to point from one copy to the other (e.g., if the pointer points to psw_copy1 before the PSW update instruction, then the pointer is changed to psw_copy2). The very first state of that copy begins in the empty state 240. The PSW update instruction is then processed through the pipeline 200. Once the PSW update instruction reaches the finish stage 222 (FIG. 2), the state of the associated PSW copy transitions to the written state 242 at transition 246. After the PSW update instruction completes the completion stage 224, the state of the associated PSW copy transitions to the completed state 244 at transition 248.

The state of the associated PSW copy then returns back to the empty state 240 when a younger writer t has reached the completion stage 224 at transition 252. In various embodiments, during processing of the instruction, a pipeline flush, where the PSW write instruction moves from the finish stage 222 back to the fetch stage 210, may occur. In this case, the state of the PSW copy transitions from the written state 242 to the empty state 240 at transition 250.

As can be appreciated, there can be multiple PSW update instructions in the issue queue (i.e. dispatched but not yet finished). For example, a first PSW update instruction is associated with psw_copy1, a second PSW update instruction is associated with psw_copy2, and a third PSW update instruction is associated with psw_copy1. The PSW update instructions are issued in order. This is done because the fields of a to-be-written PSW copy that are not written to by the PSW update instruction include a copy from either a completed copy or a next older written copy. If a PSW update instruction is associated with a PSW copy that is in the completed state 244 or the written state 242, that PSW update instruction is rejected until the associated copy reaches the empty state 240. The in order of issuance ensures that a younger PSW update instruction to the same copy does not issue before an older PSW update instruction associated with that copy has finished.

In various embodiments, there can be only one PSW update instruction in the pipeline 200 from the finish stage 222 until the completion stage 224. Although, this number can vary, based on the number of copies (e.g., the number is equal to the number of psw copies minus one since one copy is reserved for the completion stage 224). If a PSW update instruction is issued when another PSW update instruction is between the finish stage 222 and the completion stage 224, then the issued instruction is rejected. As discussed above, if there are more PSW copies, then there can be more PSW update operations within the finish stage 222 and the completion stage 224.

The issuance of PSW consumer instructions (e.g., instructions that read the PSW) is then based on the PSW update instructions. For example, a younger PSW consumer instruction is made dependant upon a PSW update instruction. The PSW consumer instructions are then issued a number N of cycles after the PSW update instruction itself is issued, where N is an integer value. In this example, when the PSW update instructions are issued to the load store unit with a latency of four cycles, N has a value equal to four. These four gap cycles are enough to bypass the new PSW copy to the dependent instructions. Most common usages that rely on this four cycle gap are operand access, FXU usage, and completion stage usage.

In various embodiments, the PSW manager 226 can further manage the PSW based on specific bit usage of the PSW. For example, in order to handle instruction decode/grouping unit (IDU) handling for PSW AS bits interlock, PSW update instructions that specifically update the AS bits (e.g., SAC, SACF) are identified. The PSW update instructions are marked to indicate that there is a pending AS bits update. The pending bits remain until the finish of the instruction when the new AS bits are known. AR-Base is identified as a source for the mapper if an instruction is decoded while there is still a pending AS bits. AR-base is a source for translation in address register mode. Since the AS bits are not know, then the AR-base is indicated as source. If an instruction relies on AS bits for exception detection in prior stages than the mapper and issue stage 216, the instruction is marked with potential exception and serialize before the instruction is requested. A serialization event guarantees that the AS bits will be known when the instruction is re-decoded again.

In another example, implicit usage of PSW bits in an instruction fetch ($Ifetch) causes a serialization if the new PSW updated bits causes a different behavior in the $Ifetch. An example includes a PER bit or DAT bit update (from 0 to 1 or from 1 to 0) can affect the $ifetching and as a result a serialization is performed after the completion of the PSW update instruction. The serialization guarantees that the instructions younger than the PSW update operations are fetched using the most recent PSW bits.

Not every AS bit update affects the instruction fetch. Instruction fetches are done on primary sort host unlike operand fetches that have four modes of fetching. As a result, an AS bits update that does not affect $I fetch will not cause serialization. Finally, the KEY field is only relevant to instruction fetch if instruction fetch protecting is enabled for subset of KEY values. Therefore, a KEY update (that is primarily intended for operand fetches) does not cause serialization if instruction fetch is not affected.

Figure 5:
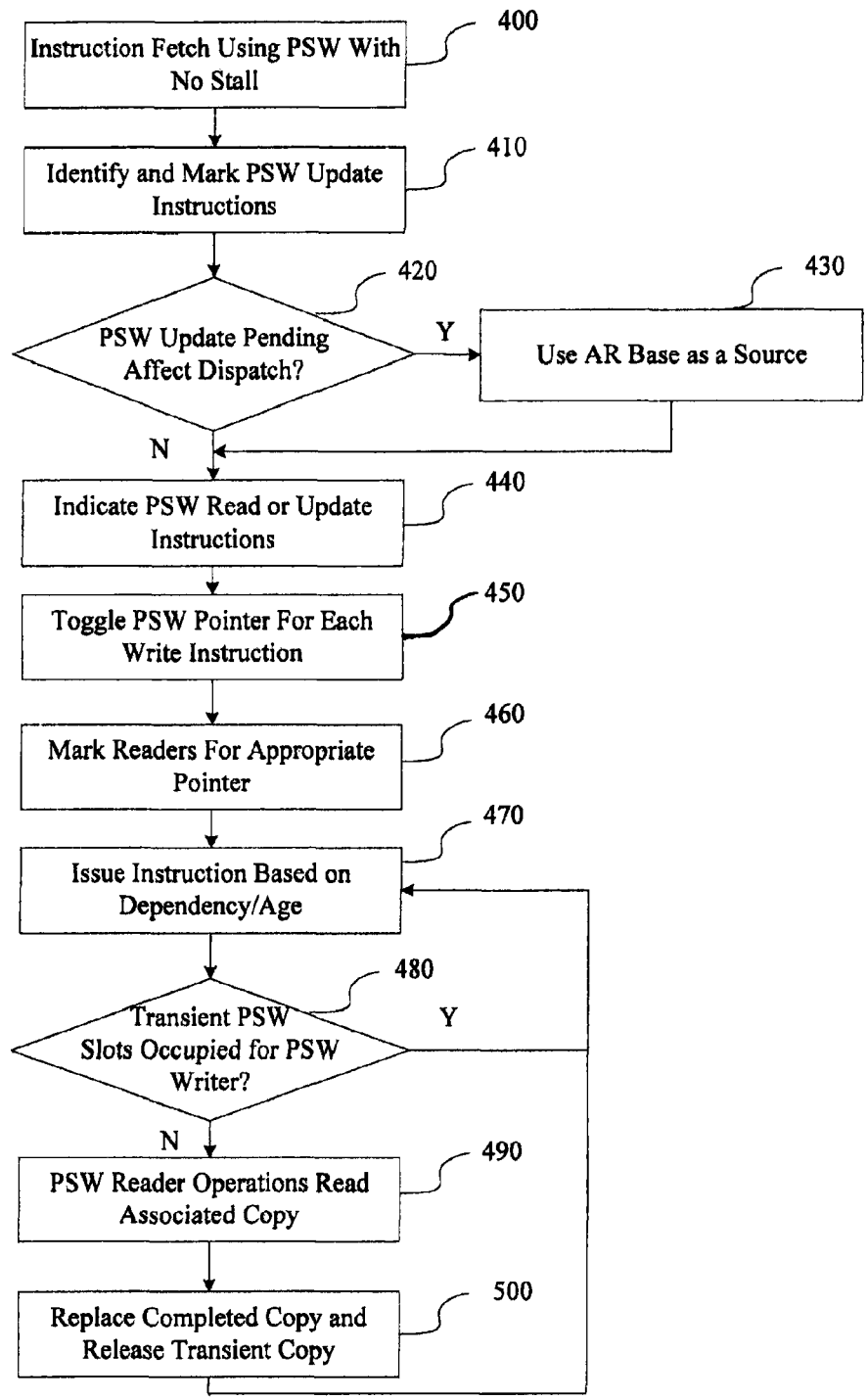
FIG. 5 is a flowchart illustrating a program status data handling method in accordance with exemplary embodiments.

FIG. 5 illustrates a PSW handling method that can be performed by the processor sub-system of FIG. 2 in accordance with exemplary embodiments. As can be appreciated in light of the disclosure, the order of operation within the method is not limited to the sequential performance as illustrated in FIG. 5, but may be performed in one or more varying orders as applicable and in accordance with the present disclosure. As can be appreciated, one or more steps can be added or deleted from the method without altering the spirit of the method.

At 400, an instruction fetch is performed using the current PSW with no stall. Thereafter, PSW update instructions are identified at 410. The update instructions are marked. This mark remains until all the instructions execute and finish.

If the PSW update instruction pending affects dispatch or the PSW update value indicates AR at 420, then the AR-Base is used as a source and the instruction is marked with a possible exception based on the PSW at 430. Otherwise, the read and update instructions are indicated at 440. The pointer is then toggled at 450, based on the update instructions. The read instructions are marked based on the pointer at 460. The instructions are then issued from the issue queue based on at least one of its dependency and age at 470.

If transient slots are occupied for a PSW write instruction at 480, the instruction is rejected back to 470. If transient slots are not occupied, the PSW writer instruction may proceed to write the appropriate PSW copy at 490. Once the instruction finishes and completes, it will replace the completed copy of the PSW register and a transient copy is released at 500. Thereafter, the method continues with processing the instructions in the queue at 470.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for processing instructions of a computer program, the apparatus comprising:
a processor configured to perform a method comprising:
providing at least two copies of program status data;
identifying a first update instruction of the instructions that writes to at least one field of the program status data;
associating the first update instruction with a first copy of the at least two copies of program status data using a pointer that points to a first copy of the at least two copies of program status data by toggling the pointer to point to a second copy of the at least two copies of the program status data;
identifying a second update instruction of the instructions that writes to at least one field of the program status data, the second update instruction being in an issue queue associated with a pipeline at the same time as the first update instruction, and the second update instruction being younger than the first update instruction; and
associating the second update instruction with a second copy of the at least two copies of program status data using the pointer by toggling the pointer to point to the first copy of the at least two copies of the program status data.

2. The apparatus of claim 1 wherein the method further comprises associating each of the at least two copies with a state based on a transition condition, where the state includes at least one of an empty state, a written state, and a completed state.

3. The apparatus of claim 2 wherein the method further comprises rejecting the first update instruction from issuance based on a state of the first copy.

4. The apparatus of claim 3 wherein the method further comprises re-issuing the rejected first update instruction based on a state of the copy.

5. The apparatus of claim 2 wherein the method further comprises issuing the first update instruction and the second update instructions based on the states of the at least two copies.

6. The apparatus of claim 1 wherein the method further comprises managing the first update instruction and the second update instruction such that the second update instruction is issued after the first update instruction writes to the first copy.

7. The apparatus of claim of claim 1 wherein the method further comprises identifying a first consumer instruction of the instructions that reads from at least one field of the program status data.

8. The apparatus of claim 7 wherein the method further comprises associating the first consumer instruction with at least one of the first update instruction and the first copy of the program status data.

9. The apparatus of claim 8 wherein the method further comprises delaying issuing the first consumer instruction from the issue queue for N cycles, wherein N is an integer value.

10. The apparatus of claim 1 wherein the method further comprises identifying whether the first update instruction writes to a particular field of the program status data and serializing the first update instruction.

11. A computer implemented method of processing instructions of a computer program, the method comprising:
providing at least two copies of program status data;
identifying a first update instruction of the instructions that writes to at least one field of the program status data;
associating the first update instruction with a first copy of the at least two copies of program status data using a pointer that points to a first copy of the at least two copies of program status data by toggling the pointer to point to a second copy of the at least two copies of the program status data;
identifying a second update instruction of the instructions that writes to at least one field of the program status data, the second update instruction being in an issue queue associated with a pipeline at the same time as the first update instruction, and the second update instruction being younger than the first update instruction; and
associating the second update instruction with a second copy of the at least two copies of program status data using the pointer by toggling the pointer to point to the first copy of the at least two copies of the program status data.

12. The method of claim 11 further comprising associating each of the at least two copies with a state based on a transition condition, where the state includes at least one of an empty state, a written state, and a completed state.

13. The method of claim 12 further comprising issuing the first update instruction and the second update instructions based on the states of the at least two copies.

14. The method of claim 11 further comprising managing the first update instruction and the second update instruction such that the second update instruction is issued after the first update instruction writes to the first copy.

15. The method of claim 11 further comprising:
identifying a first consumer instruction of the instructions that reads from at least one field of the program status data;
associating the first consumer instruction with at least one of the first update instruction and the first copy of the program status data; and
delaying issuing the first consumer instruction from the issue queue for N cycles, wherein N is an integer value determined based on the first update instruction.

16. The method of claim 11 further comprising rejecting the first update instruction from issuance based on a state of the first copy.

17. The method of claim 11 wherein the method further comprises identifying whether the first update instruction writes to a particular field of the program status data and serializing the first update instruction.

18. A computer program product for processing instructions of a computer program, comprising a tangible, non-transitory storage medium readable by a processing circuit and storing instructions for execution by the processing circuit for performing a method comprising:
providing at least two copies of program status data;
identifying a first update instruction of the instructions that writes to at least one field of the program status data;
associating the first update instruction with a first copy of the at least two copies of program status data using a pointer that points to a first copy of the at least two copies of program status data by toggling the pointer to point to a second copy of the at least two copies of the program status data;
identifying a second update instruction of the instructions that writes to at least one field of the program status data, the second update instruction being in an issue queue associated with a pipeline at the same time as the first update instruction, and the second update instruction being younger than the first update instruction; and
associating the second update instruction with a second copy of the at least two copies of program status data using the pointer by toggling the pointer to point to the first copy of the at least two copies of the program status data.

* * * * *